(12) United States Patent
Kuhne (10) Patent No.: US 10,050,312 B2
(45) Date of Patent: Aug. 14, 2018

(54) ELECTROCHEMICAL STORAGE DEVICE HAVING IMPROVED ELECTRICAL CONDUCTION PROPERTIES

(71) Applicant: Siemens Aktiengesellschaft, Munich (DE)

(72) Inventor: Michael Kuhne, Furth (DE)

(73) Assignee: Siemens Aktiengesellschaft, Munich (DE)

( * ) Notice: Subject to any disclaimer, the term of this patent is extended or adjusted under 35 U.S.C. 154(b) by 421 days.

(21) Appl. No.: 14/759,332

(22) PCT Filed: Dec. 19, 2013

(86) PCT No.: PCT/EP2013/077394
§ 371 (c)(1),
(2) Date: Jul. 6, 2015

(87) PCT Pub. No.: WO2014/108295
PCT Pub. Date: Jul. 17, 2014

(65) Prior Publication Data
US 2015/0349383 A1    Dec. 3, 2015

(30) Foreign Application Priority Data
Jan. 8, 2013  (EP) .................................. 13150509

(51) Int. Cl.
*H01M 2/26* (2006.01)
*H01M 2/02* (2006.01)
(Continued)

(52) U.S. Cl.
CPC .......... *H01M 10/39* (2013.01); *H01M 2/0252* (2013.01); *H01M 2/208* (2013.01);
(Continued)

(58) Field of Classification Search
CPC .......... H01M 10/39; H01M 2/26; H01M 2/02; H01M 2/24
See application file for complete search history.

(56) References Cited

U.S. PATENT DOCUMENTS

| | | | | | |
|---|---|---|---|---|---|
| 455,986 | A | * | 7/1891 | Hays ....................... | H01M 2/30 |
| | | | | | 174/84 R |
| 2,666,803 | A | * | 1/1954 | Kurlandsky ............ | H01M 2/20 |
| | | | | | 174/126.2 |

(Continued)

FOREIGN PATENT DOCUMENTS

| DE | 3442453 A1 | 5/1986 |
|---|---|---|
| EP | 0065170 A1 | 11/1982 |

(Continued)

OTHER PUBLICATIONS

Machine Translation of: DE 3442453 A1, Hartmann et al., May 22, 1986.*

*Primary Examiner* — Kenneth J Douyette
(74) *Attorney, Agent, or Firm* — Beusse Wolter Sanks & Maire (57) ABSTRACT

An electrochemical storage device has an anode chamber filled with anode material during operation, and a cathode chamber filled with cathode material. The anode chamber is separated from the cathode chamber by solid body electrolyte guiding ions, and the anode chamber is limited on one side by the solid body electrolyte, on another side by a wall at least partially surrounding the solid body electrolyte. The wall is surrounded by a head part of the device, by a base part arranged opposite the head part and/or by a lateral part arranged between the head and base part. The wall has an electrical conductive wall section as an anode to the anode chamber, an at least partially flat, electrical conductive line section electrically connected to the wall section by a surface, and conductivity per surface of the line section (Continued)

greater than conductivity of the wall per surface of the wall section.

20 Claims, 3 Drawing Sheets

(51) Int. Cl.
 *H01M 10/39* (2006.01)
 *H01M 2/20* (2006.01)
 *H01M 2/22* (2006.01)
(52) U.S. Cl.
 CPC .............. *H01M 2/22* (2013.01); *H01M 2/26* (2013.01); *H01M 10/3909* (2013.01); *H01M 10/3981* (2013.01); *H01M 2220/30* (2013.01)

(56) References Cited

U.S. PATENT DOCUMENTS

| 3,969,143 | A | * | 7/1976 | Mead | ................... | H01M 2/0202 |
| | | | | | | 429/179 |
| 4,443,525 | A | | 4/1984 | Hasenauer | | |
| 5,061,580 | A | * | 10/1991 | Wedlake | ................. | B28B 1/002 |
| | | | | | | 264/618 |

FOREIGN PATENT DOCUMENTS

| JP | 2001243976 A | 9/2001 |
| WO | 9612311 A1 | 4/1996 |

* cited by examiner

FIG 6

ELECTROCHEMICAL STORAGE DEVICE HAVING IMPROVED ELECTRICAL CONDUCTION PROPERTIES

CROSS REFERENCE TO RELATED APPLICATIONS

This application is the US National Stage of International Application No. PCT/EP2013/077394 filed 19 Dec. 2013, and claims the benefit thereof. The International Application claims the benefit of European Application No. EP13150509 filed 8 Jan. 2013. All of the applications are incorporated by reference herein in their entirety.

FIELD OF INVENTION

The present invention relates to an electrochemical storage device which has an anode compartment filled with an anode material and a cathode compartment filled with a cathode material, wherein the anode compartment is separated from the cathode compartment by an ion-conductive solid electrolyte, and wherein the anode compartment is delimited on one side at least in part by the solid electrolyte and on another side at least in part by a wall which at least in part surrounds the solid electrolyte, which wall is comprised by a top part of the electrochemical storage device, a bottom part arranged opposite the top part, and/or a side part arranged between top part and bottom part, and wherein the wall has an electrically conductive wall portion, which is associated as anode with the anode compartment. Likewise, the invention relates to a thermal module for storing and releasing electrical energy, comprising multiple such electrically interconnected electrochemical storage devices.

BACKGROUND OF INVENTION

The designation of the electrodes in question as anode and cathode will here follow the convention that the electrode designated as anode is the one which, on discharge of the electrochemical storage device, brings about oxidation of the anode material. The respective other electrode will be designated as cathode. It is clear to a person skilled in the art in this respect that the function of the electrodes is reversed on charging of the electrochemical storage device.

The electrochemical storage device described and claimed here takes the form of a high-temperature storage device which requires a minimum temperature of at least 100° C. as its operating temperature. In particular, the operating temperature amounts to between 200° C. and 350° C. Under these temperature conditions, the operating temperature is sufficiently high for the solid electrolyte to have a good ion-conductive action. Good ion conduction consequently makes only a small contribution to the internal resistance of the electrochemical storage device.

However, it is also possible to provide an operating temperature of up to 500° C. Typical electrochemical storage devices to which the invention relates are those based on sodium-nickel chloride cell (NaNiCl2 cell) or sodium-iron chloride cell ($NaFeCl_2$ cell) technology or mixed forms of said cells, or on sodium-sulfur cell (NaS cell) technology.

The structure of a conventional electrochemical storage device based on sodium-nickel chloride cell technology has a negative electrode which for instance takes the form of the anode during discharging operation, the anode material of which is liquid sodium at operating temperature. Said sodium typically fills part of the anode compartment. The positive electrode during discharging operation, i.e. the cathode, comprises a cathode compartment which is at least in part filled by a suitable metal, for instance nickel (Ni), mixed with a likewise suitable salt, for instance sodium chloride (NaCl), and for instance further suitable additives, for example aluminum chloride ($AlCl_3$). At the operating temperature of the electrochemical storage device, the mixture typically at least in part takes the form of a liquid electrolyte.

It should also be noted at this point that the electrochemical storage device claimed according to the invention is here described as it is present in a typical working operating state. Since electrochemical storage devices sometimes have to undergo initial electrical charging prior to start-up, the configuration of the electrochemical storage device prior to start-up may sometimes be different from that described here. In particular, prior to initial charging the anode compartment may for instance not as yet have been filled with an anode material.

The anode compartment and cathode compartment are separated from one another by a solid electrolyte which, as a ceramic separator, is permeable only to ions. The solid electrolyte is not intended to permit any mass exchange other than that involving ions. Typical solid electrolytes which are used in sodium-nickel chloride cells comprise $\beta\text{-}Al_2O_3$ or $\beta''\text{-}Al_2O_3$ as the ceramic material. This permits a specific ion conductivity for $Na^+$ ions which are transported between the anode compartment and cathode compartment through the solid electrolyte depending on the potential gradient. The crucial reactions during charging operation or discharging operation are revealed by the following reaction equation (discharging operation from left to right; charging operation from right to left): $2Na + NiCl_2 \leftrightarrow 2NaCl + Ni$ At the equilibrium state, a voltage of approx. 2.58 volts may accordingly arise between the anode and cathode.

For practical applications such electrochemical storage devices are interconnected to form thermal modules, wherein metallically conductive contacting devices are typically mounted in the region of the top part for current tapping. The charge carriers here accumulate in the area surrounding these contacting devices, wherein a sometimes high local current density may however occur at these contacting devices. In the case of high power storage devices in particular, relatively significant heat production may arise in these regions due to the ohmic losses. However, this puts at risk reliable operation of such thermal modules and additionally brings about a reduction in the overall electrical efficiency of individual electrochemical storage devices of up to several percentage points in comparison with regular operation.

Such ohmic losses are accepted in storage devices which are not designed for high power applications, the losses being relatively low. However, if the electrochemical storage devices are exposed to very high local current densities and operated at the limits of their design, power losses of several watts may occur. In particular in the case of electrochemical storage devices based on sodium-nickel chloride cell technology, with walls sometimes made of relatively thin sheet metal, a voltage drop of up to over 50 mV may thus be caused, which corresponds for example at 100 A to a local heat source of around 5 watts of power per storage device.

SUMMARY OF INVENTION

An object of the present invention is accordingly to propose an electrochemical storage device which avoids the disadvantages known from the prior art. The electrochemical storage device proposed according to the invention is intended in particular to allow operation also at high current densities, wherein the ohmic power loss is however intended to be reduced in comparison with conventional storage devices. In particular, it is intended to propose improving a storage device in terms of energy lost as heat through a simple, inexpensive structural modification to electrochemical storage devices known from the prior art. The improved current conduction behavior is intended in particular to relate to the conduction behavior of the anode.

According to aspects of the invention, these objects underlying the invention are achieved by an electrochemical storage device as claimed and by a thermal module as claimed.

The objects underlying the invention are in particular achieved by an electrochemical storage device which has an anode compartment filled with an anode material and a cathode compartment filled with a cathode material, wherein the anode compartment is separated from the cathode compartment by an ion-conductive solid electrolyte, and wherein the anode compartment is delimited on one side at least in part by the solid electrolyte and on another side at least in part by a wall which at least in part surrounds the solid electrolyte, which wall is comprised by a top part of the electrochemical storage device, a bottom part arranged opposite the top part, and/or a side part arranged between top part and bottom part, and wherein the wall has an electrically conductive wall portion, which is associated as anode with the anode compartment, wherein an at least partly flat, electrically conductive conductor portion is included, which is electrically connected with the wall portion via a surface, and wherein the conductivity per unit area of the conductor portion is greater than that of the wall per unit area of the wall portion.

Furthermore the objects underlying the invention are achieved by a thermal module for storing and releasing electrical energy, comprising multiple electrically interconnected electrochemical storage devices according to the embodiments described above or below, wherein the at least partly flat conductor portion is contacted electrically with suitable electrical leads for infeed and outfeed of electrical charge to the anode.

According to a typical, advantageous embodiment of the electrochemical storage device, the latter is based on sodium-nickel chloride cell or sodium-iron chloride cell technology, or on mixed forms thereof. In this case, the anode material comprises sodium or is sodium, which assumes liquid form at operating temperature. The cathode material is typically a mixture of a metal (for instance Ni) with at least one salt (for instance NaCl) and possibly at least one further additive (for example $AlCl_3$ or $NaAlCl_4$). At operating temperature the mixture at least in part assumes the form of a liquid electrolyte melt, which wets the solid electrolyte.

According to aspects of the invention, the solid electrolyte permits the exchange of ions between anode compartment and cathode compartment. This does not, however, also involve any direct mass exchange which may be understood to be an exchange of fluid or solid. The solid electrolyte is furthermore particularly configured to be selective for conducting specific ions of the anode material. According to sodium-nickel chloride cell technology, the solid electrolyte is for instance selectively conductive for Na+ ions. Alternatively or indeed in addition, conductivity may be possible for $Li^+$ or $K^+$ ions.

In addition to closing the storage device, the top part of the electrochemical storage device may also serve to contact the storage device electrically with electrical leads. When the storage device is in operational orientation, the bottom part here typically serves to support the storage device on a surface which is not further specified.

It should be noted at this point that, in the event that a described technical mode of action of individual technical features is intended to be dependent on the orientation of the electrochemical storage device in space, it should be assumed that the orientation is to be determined relative to the earth's gravitational field during operation of the storage device. The bottom part of the electrochemical storage device is accordingly located closer to the earth's core than the top part. The orientation is additionally typically such that the connection between the top part and bottom part is arranged substantially parallel to the direction of the earth's gravitational field.

The inventive concept is based on the fact that the electrically conductive wall portion, which is associated as anode with the anode compartment, is provided at least in part with a partly flat electrically conductive conductor portion. The wall portion and conductor portion are here connected electrically, such that a charge exchange may take place between wall portion and conductor portion.

The invention further provides that the conductivity per unit area of the conductor portion is greater than that of the wall per unit area of the wall portion. Consequently the conductor portion has a higher surface conductivity than the wall portion respectively in electrical contact therewith. If electrical charge is then fed to or from the electrochemical storage device via the conductor portion, the thermal power loss due to ohmic losses is reduced in comparison with an electrochemical storage device which is not provided with a conductor portion according to the invention.

Conductivity relates in the present case to the electrochemical storage device electrical currents arising under typical operating conditions. This is in particular an electrical direct current.

In addition to the at least partly flat conductor portion functioning as a component for reducing the electrical ohmic power loss, the conductor portion is also capable of providing a supporting function for the electrochemical storage device. Since, with conventional electrochemical storage devices, walls in particular comprised by the side part are constructed for reasons of material costs and weight of relatively thin, flat components, these may sometimes not exhibit any significant load-bearing capacity with regard to mechanical influences. For this reason, in particular when installing and maintaining such electrochemical storage devices in thermal modules damage repeatedly occurs, which limits the functionality of such storage devices. This in turn has an undesired effect on the electrical efficiency of such storage devices and also on the necessary frequency of maintenance for the thermal modules comprising them.

As a result of the reduction according to the invention of thermal power loss due to ohmic losses, the electrochemical storage device may also be operated with relatively higher current densities during discharging and charging operation, such that operation as a high-efficiency cell is also possible. Such high-efficiency cells are needed in particular in relation to the storage of power generated by power stations for temporary intermediate storage and subsequent re-release into the public power supply networks.

According to a particularly advantageous embodiment of the invention, provision is made for the surface of the conductor portion to be adapted to the surface profile of the wall portion. In this respect, it is not necessary to provide a perfect fit, or for said adaptation to take place over the entire surface. Adaptation of the surface of the conductor portion to the surface profile of the wall portion is merely intended to ensure that the two may be brought suitably into sufficient electrical contact with one another. To this end, the two should be brought into planar contact to such an extent that the two are also advantageously electrically contacted. It is advantageous here for the surface of the conductor portion substantially to follow the surface profile of the wall portion.

According to the embodiment, it is also particularly advantageous for the wall portion to be arranged in a region which delimits a part of the anode compartment which is already filled with anode material at a state of charge of for instance at least 50%, since in this way electrical charge may be conducted away by means of direct electrical conduction through the anode material and through the wall to the at least partly flat conductor portion. In such an arrangement relatively smaller ohmic losses occur than if, for example, the anode compartment is as yet filled insufficiently with anode material to allow direct electrical conduction.

The wall portion and/or the conductor portion are in particular metallic. The two portions also may take the form of metal sheets.

According to a further embodiment of the invention, provision is made for the wall portion to have a wall thickness which is less than the thickness of the at least partly flat conductor portion in the region of the specified surface. Due to the greater thickness of the conductor portion, this again has an elevated electrical conductivity per unit area in the region of the specified surface, which is electrically connected with the wall portion, and is then in particular suitable for reducing the overall resistance on infeed and outfeed of electrical charge on contacting with a current tap.

According to a further advantageous embodiment of the invention, provision is made for the wall portion and the at least partly flat conductor portion to be metallic, wherein the two are connected together in a mechanically load-bearing manner via a strong metallic connection, in particular a welded joint. The metallic connection according to the embodiment does not here necessarily require the provision of a third metal. It is sufficient merely for the two metallic portions to be electrically connected together for instance via a mechanically load-bearing clamp connection. Welded joints using a third metal are however suitable for strong connection of the two conductor portions in particular. In addition, such connections exhibit suitable mechanical strength for instance additionally to reinforce the wall portion mechanically in the region of the weld.

As an alternative to a welded joint, other types of connection may also be used, for instance a plug-in connection, a clamp connection, a brazed joint etc.

The wall portion and the partly flat conductor portion also may have substantially identical coefficients of thermal expansion, such that, on modification of the operating temperature, any thermal stresses between the two are relatively low. In particular, no bimetal should be produced by the connection of wall portion and conductor portion.

According to a further embodiment of the invention, provision is made for the wall portion and the at least partly flat conductor portion to be made in one piece. In particular, the conductor portion may merely take the form of a reinforcement of the wall portion. Likewise, the conductor portion may take the form of a suitable flat formed portion, for example a bend or a multiple bend. The one-piece embodiment of wall portion and conductor portion results, depending on the specific embodiment, in advantageous electrical connections of wall portion and conductor portion or is inexpensive to produce.

According to a further embodiment of the invention, provision is made for the wall portion to be arranged closer to the top part than to the bottom part. In this respect, current tapping may proceed via the conductor portion in the vicinity of the top part. This is advantageous in particular when interconnecting a plurality of electrochemical storage devices in a thermal module, since the electrochemical storage devices have merely to be electrically interconnected on one side.

According to one further advantageous aspect of the invention, the wall portion is arranged at the side part. The side part is of conductive construction, in particular in storage devices based on sodium-nickel chloride cell technology, in order to contact the anode. In other words, in operation the potential of the side part substantially corresponds to the anode potential.

According to a further embodiment of the invention, provision is made for the at least partly flat conductor portion to partly or completely surround the top part, in particular to be arranged around the top part as a conduction sleeve. "Surround" should here be taken in particular to mean a geometry which follows the top part around at least part of the circumference thereof. The circumference may here in particular also relate to the circumference of the side part, which circumferentially encloses the top part. In this respect, the conductor portion may indeed be connected and electrically contacted with the side part, yet surround the top part. According to the embodiment, in particular in the region of the top part a suitable electrical contacting point may in this way be achieved, as well as mechanical reinforcement. By providing a conduction sleeve, the conductor portion may additionally also be suitably shaped, whereby for example subsequent provision of an existing electrochemical storage device with a flat conductor portion is also made possible. The described embodiments additionally allow easy accessibility of the anode of the electrochemical storage device.

According to a further advantageous embodiment, the at least partly flat conductor portion is formed to project above the top part. The conductor portion thus projects above the top part in the manner of a tab or a collar. In this case, the top part typically constitutes a geometric boundary of the storage device at least in the region of the wall portion. The geometry according to the embodiment may in turn promote the manual accessibility of the electrical contact points. In addition, the projecting portion allows additional fastening of other functional parts, for example of insulators, as described in greater detail further below.

According to a further advantageous embodiment of the invention, provision is made for the conductor portion to have a surface on which an electrical insulator is mounted, in particular on a surface facing away from the electrochemical storage device. Such an electrical insulator is capable in particular of arranging individual electrochemical storage devices electrically insulated from one another in the event of arrangement for instance in a thermal module. Since in particular the side parts may be of electrically conductive construction, it is possible for instance for a short circuit to arise on electrical contact between two electrochemical storage devices. By providing suitably mounted insulators, it is possible to avoid such undesired short-circuiting.

According to a further particularly advantageous embodiment of the invention, provision is made for the electrically conductive wall portion to be comprised by the side part, which is made from shaped sheet metal. Since, in particular in the case of side parts at anode potential, the latter are also electrically interconnected for contacting the anodes, the side part is particularly suitable.

According to a first embodiment of the thermal module according to the invention, provision is made for the conductor portion also to be configured as a support, which supports the electrochemical storage devices against other electrochemical storage devices, against other supports of other electrochemical storage devices and/or against a module surface. In order to avoid an electrical short circuit in the case of such a support, insulators may additionally also be provided. These may for example be arranged on the conductor portion, or indeed also be present as separate, singulated components. By constructing the conductor portion as a support, it is consequently possible to achieve a mechanically stable arrangement of individual electrochemical storage devices which can withstand external mechanical loading. In particular when not using such thermal modules in a static environment, but rather for instance in mobile applications in a moving environment, such a strong supporting structure proves particularly advantageous.

According to a further possible embodiment of such a thermal module, provision may be made for the at least partly flat conductor portion to have a suitably shaped receptacle for an insulator. In this respect, the conductor portion may also comprise suitably shaped retaining means. A receptacle may also be configured such that the insulator may be inserted between different regions of the conductor portion. Through a suitably shaped receptacle for the insulator, the insulator may be connected in a secure and design-appropriate manner to the flat conductor portion.

The invention will be explained in detail below with reference to individual schematic representations. It should be noted here that the representations in the figures are merely schematic and do not limit the invention with regard to the practicability thereof.

It should further be noted that components which are provided with the same reference numerals have the same technical effect and function.

It should further be noted that the individual features shown in the figures are claimed alone and taken together in any desired way with other features, insofar as the embodiment achieved thereby is covered by the present inventive concept.

DETAILED DESCRIPTION OF INVENTION

Figure 1:
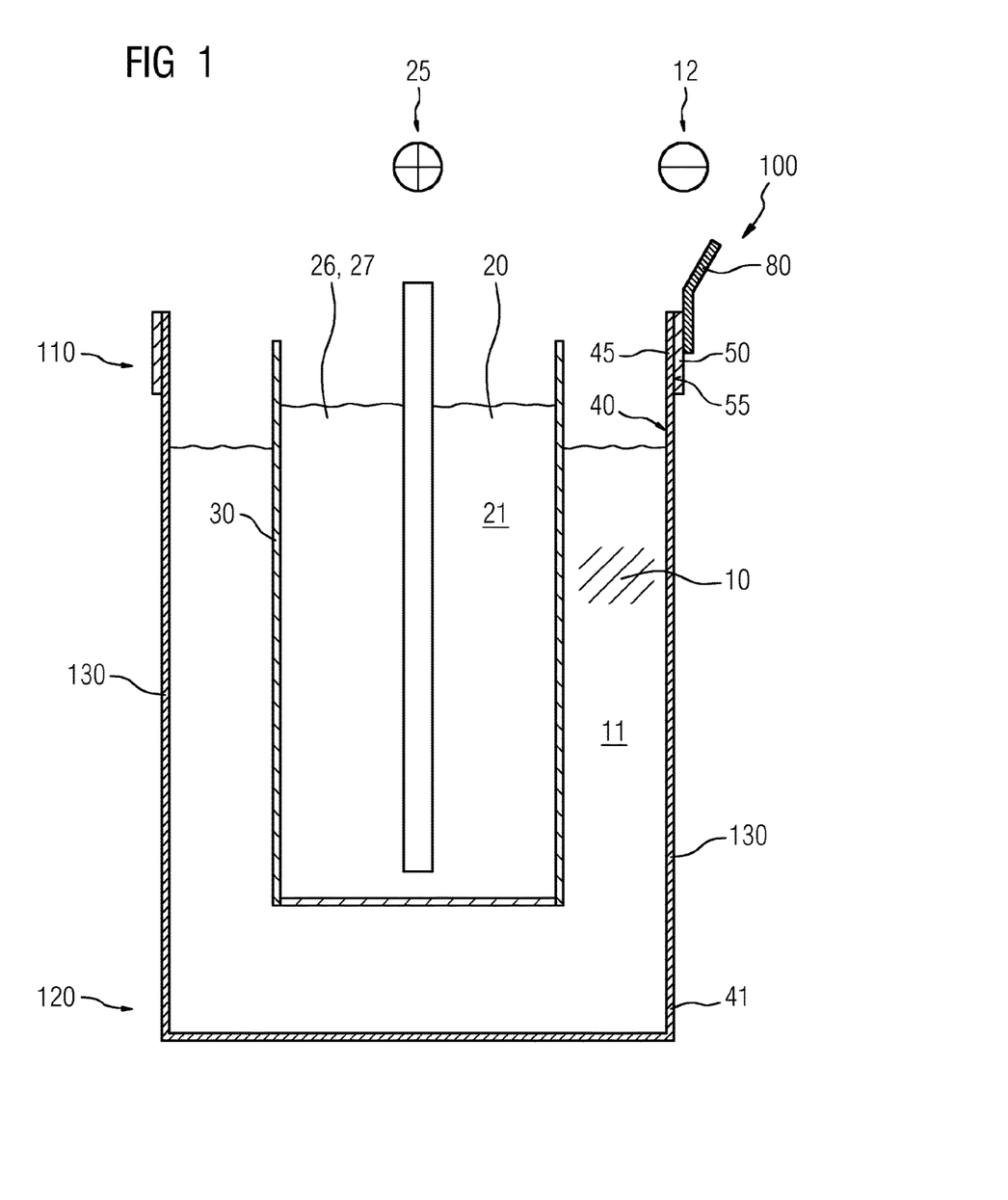
FIG. 1 shows a schematic representation of a sectional view from the side through a first embodiment of an electrochemical storage device according to the invention.

FIG. 1 shows a lateral sectional view through a first embodiment of an electrochemical storage device 100 according to the invention, which has an anode compartment 11 separated from a cathode compartment 21 by a solid electrolyte 30. In a typical operating state as shown here, the anode compartment 11 is filled with anode material 10. The cathode compartment 21 is likewise filled with cathode material 20. The solid electrolyte 30 is here of can-shaped construction.

According to sodium-nickel chloride cell technology, the anode material is elemental sodium which assumes liquid form at the operating temperature of the storage device 100 (for instance between 200° C. and 350° C.).

The filling level of the liquid content of cathode material 20 in the cathode compartment 21 correlates, depending on the state of charge of the electrochemical storage device 100, with the filling level of the anode compartment 11. In the present case, the cathode material 20 in particular comprises a cathode 25, together with a cathode salt 26 and a cathode electrolyte 27, which are here shown as one. According to sodium-nickel chloride cell technology, the cathode 25 takes the form for example of metallic nickel bar (nickel wire) which is surrounded by metallic nickel powder, and the cathode salt 26 the form of sodium chloride.

In the region of the top part 110 of the electrochemical storage device 100, the cathode 25 permits electrical contacting in order to feed electrical charge in or out, depending on the state of charge or discharge of the storage device 100. The anode of the electrochemical storage device 100 is formed by the side part which is also made of metal. The side part 130 is in turn part of a can 41 which comprises both the bottom part 120 and the side part 130. Sealing of the electrochemical storage device 100 in the region of the top part 110 may proceed according to teaching known from the prior art.

The solid electrolyte 30 comprised by the electrochemical storage device 100 permits a specific ion conductivity, but without enabling any further mass exchange between the anode compartment 11 and cathode compartment 21. According to sodium-nickel chloride cell technology, the solid electrolyte 30 takes the form of $\beta$-$Al_2O_3$ or $\beta''$-$Al_2O_3$ and for example enables selective Na+ ion conductivity. In this respect, on charging of the electrochemical storage device 100, the Na+ ions are capable of migrating from the cathode compartment into the anode compartment, wherein they are reduced there to elemental sodium by the provision of electrons. Over the course of the charging process, said elemental sodium accumulates to an increasing extent in the anode compartment.

If the electrochemical storage device 100 is discharged, Na+ ion transport proceeds in the opposite direction, wherein sodium is oxidized at the interface between the solid electrolyte and the anode material, after which the resultant Na+ ion migrates through the solid electrolyte into the cathode compartment 21. The filling level of anode material 10 in the anode compartment 11 and of cathode electrolyte 27 in the cathode compartment 21 thus differs depending on the state of charge or discharge.

In addition to electrical contacting via the cathode 25, the electrochemical storage device 100 allows electrical contacting of the anode 12 via a contacting means 80. This contacting means 80, which need not here also be claimed, may for example take the form of a conducting lug. The contacting means 80 is electrically connected with the conductor portion 50, wherein the conductor portion 50 is itself electrically connected with the wall portion 45 of the wall 40. In the case of electrical operation of the electrochemical storage device 100, electrical charge may thus be conducted via the wall portion 45 to the conductor portion 50 and from there subsequently to the contacting means 80. According to the embodiment, the conductor portion 50 has a suitable surface profile, such that one surface 55 is adapted to the surface profile of the wall portion 45. Consequently, suitable, advantageous electrical conduction, supported by the geometry, of charge carriers may proceed between conductor portion 50 and wall portion 45.

To reduce ohmic losses in the region of electrical contact with the contacting means 80, according to the invention the contacting means 80 is not electrically connected directly with the wall portion 45 of the wall 40, but rather merely through the intermediary of the conductor portion 50. The conductivity per unit area of the conductor portion 50 is here greater than that of the wall 40 per unit area of the wall portion 45. In other words, the surface conductivity of the conductor portion 50 is greater than that of the wall portion 45. In this way, even on exposure to relatively high current densities the ohmic losses in this region are kept low, such that the thermal power loss during operation of the electrochemical storage device 100 is at an advantageous level.

The region of contact between conductor portion 50 and wall portion 45 is shown on an enlarged scale and in detail below with reference to various possible embodiments.

Figure 2:
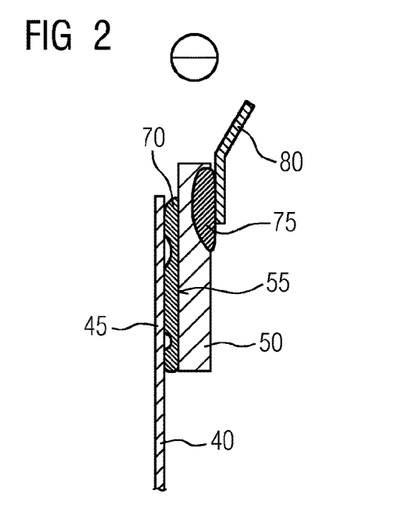
FIG. 2 shows an enlarged representation of the region of the wall portion and conductor portion in lateral sectional view as may for instance be comprised by an electrochemical storage device according to the embodiment as shown in FIG. 1.

FIG. 2 shows a first embodiment of such an enlarged region of the wall 40, at which the conductor portion 50 is brought into electrical connection with the wall portion 45 via a surface 55. The electrical connection between wall portion 45 and the surface 55 of the conductor portion 50 is brought about by a flux material 70, which is a welding material for example. The flux material 70 may or indeed may not be a third material. In particular, the flux material 70 is welded metal, which connects the conductor portion 50 with the wall portion 45 by a welded joint.

The cross-sectional representation shows that both the wall portion 45 and the conductor portion 50 are substantially flat. In this case, one direction of extension of the component (from top to bottom in the image plane) has a distinctly greater extent compared with the other, perpendicular directions of extension (from left to right in the image plane). In the present case, according to the orientation shown here the extent from top to bottom is thus distinctly greater than the extent for instance from right to left. As a result of the different thicknesses of these flat components, i.e. of wall portion 45 and of conductor portion 50, a different surface conductivity is obtained for the respective components. It is thus clear that the ohmic losses for a relatively thicker component such as the conductor portion 50 are lower than for the relatively thinner component, i.e. for the wall portion 45.

In particular, on exposure of the respective components to charges at relatively high current densities, the conductor portion 50 thus allows lower ohmic conduction losses due to its relatively greater thickness. However, since the conductor portion 50 has better conduction behavior and furthermore is also areally connected with the wall portion 45, such that on exposure to a high current density the charge carriers may be suitably conducted in areally distributed manner, thermal loss may be reduced on operation of the electrochemical storage device 100. This in turn increases overall efficiency on operation of the electrochemical storage device 100.

According to the embodiment, the contacting means 80 is in turn connected to the conductor portion 50 via a flux material 75, which allows suitable electrical contacting. The flux material 75 is particularly in turn welding material.

Figure 3:
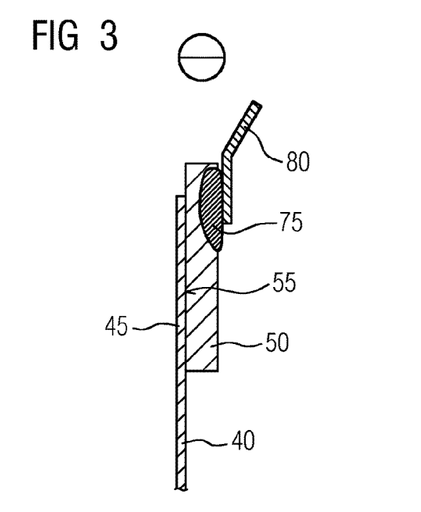
FIG. 3 shows an enlarged representation of the region of the wall portion and conductor portion in lateral sectional view as may for instance be comprised by an electrochemical storage device according to the embodiment as shown in FIG. 1.

FIG. 3 shows a further embodiment of the possible connection of conductor portion 50 and wall portion 45, as may be provided for example in the embodiment of the electrochemical storage device 100 according to FIG. 1. Here the embodiment according to FIG. 3 differs from the embodiment shown in FIG. 2 merely in that contacting of the conductor portion 50 and wall portion 45 is achieved not by a flux material 70 but by the two being in direct mechanical contact. If both are of suitable metallic construction and optionally protected against oxidation by a conductive surface layer, this direct contact alone is sufficient for electrical contacting. Contacting of conductor portion 50 and wall portion 45 in particular proceeds by plug-in contact or clamping contact.

Figure 4:
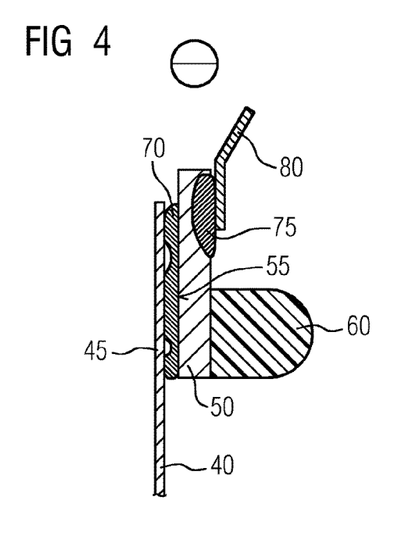
FIG. 4 shows an enlarged representation of the region of the wall portion and conductor portion in lateral sectional view as may for instance be comprised by an electrochemical storage device according to the embodiment as shown in FIG. 1.

FIG. 4 shows a further embodiment of the connection region of conductor portion 50 and wall portion 45, which is substantially like the embodiment according to FIG. 2. In addition, however, the conductor portion 50 comprises an insulator 60 directed away from the wall 40. If two electrochemical storage devices 100 are arranged next to one another in a thermal module 200 (not shown in any greater detail), said insulator is configured for instance to keep these two at a sufficient distance from one another and to insulate them electrically from one another. In the present case, the insulator 60 is provided with a rounded portion in the cross-sectional view shown.

Figure 5:
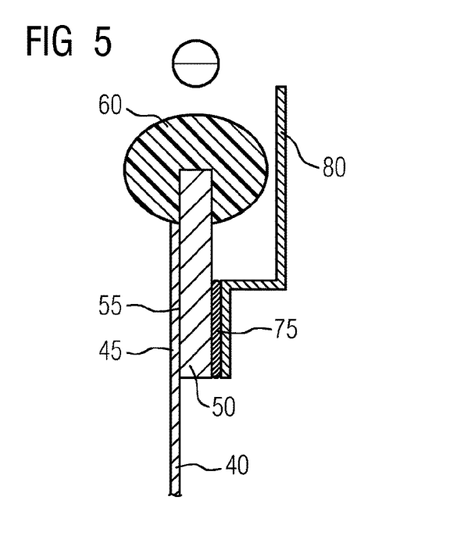
FIG. 5 shows an enlarged representation of the region of the wall portion and conductor portion in lateral sectional view as may for instance be comprised by an electrochemical storage device according to the embodiment as shown in FIG. 1.

As an alternative to the embodiment shown in FIG. 4, it is possible, as shown in FIG. 5, for the insulator 60 also to be placed onto the end of the conductor portion 50. In this case, the conductor portion 50 extends above the wall portion 45, or beyond above the top part 110 (not shown in any greater detail), such that a tab or a collar is present. A suitably shaped insulator 60 may be mounted on the end thereof. To contact the contacting means 80, the latter is then contacted in a different region of the conductor portion 50 compared with the embodiment shown in FIG. 4. However it is important in this case for the contacting means 80 not to put at risk the insulating action of the insulator 60. It is feasible, for example, that the contacting means 80 of adjacent electrochemical storage devices 100 are guided past the insulators 60 at various locations such that no electrical contact results. It is likewise conceivable that the contacting means 80 is guided within the insulator 60.

Figure 6:
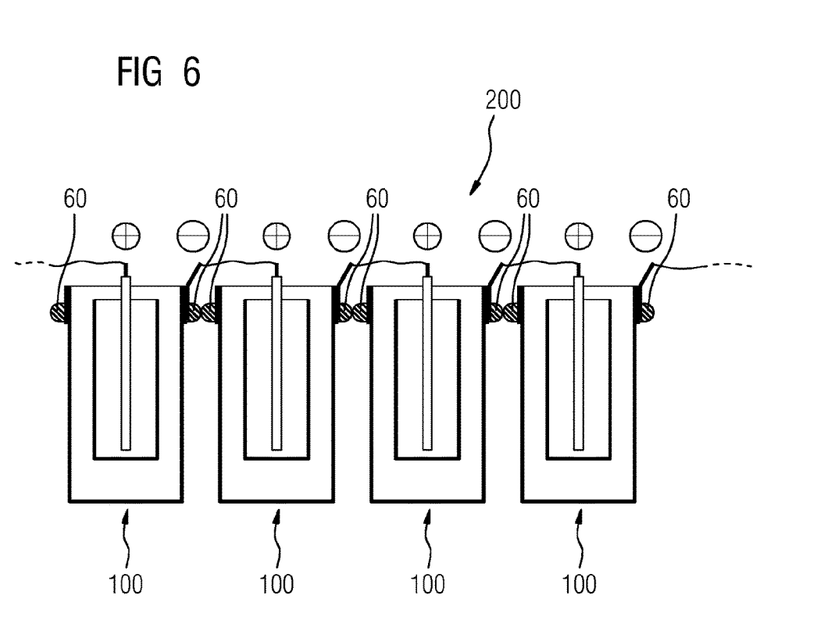
FIG. 6 shows a first embodiment of a thermal module according to the invention in lateral sectional view.

FIG. 6 shows an embodiment of the thermal module 200 according to the invention, which has multiple electrically interconnected electrochemical storage devices 100. The individual electrochemical storage devices 100 here substantially resemble the embodiment shown in FIG. 1. For suitable in- and outfeed of electrical charge at the anode 12, the conductor portions 50 are each in electrical contact with a contacting means 80. The contacting means 80 are in turn electrically interconnected together. For spacing and electrical insulation of individual, mutually adjacent electrochemical storage devices 100, insulators 60 are provided which are provided in the region of the conductor portions 50.

Further embodiments are revealed by the subclaims.

The invention claimed is:

1. An electrochemical storage device comprising:
    an anode compartment filled with an anode material and a cathode compartment filled with a cathode material when in operation,
    wherein the anode compartment is separated from the cathode compartment by an ion-conductive solid electrolyte, and
    wherein the anode compartment is delimited on one side at least in part by the solid electrolyte and on another side at least in part by a wall which surrounds the solid electrolyte at least in part, wherein the wall is comprised of a top part of the electrochemical storage device, a bottom part arranged opposite the top part, and/or a side part arranged between top part and bottom part, and wherein the wall has an electrically conductive wall portion with a surface profile facing away from the electrochemical storage device, which is associated as an anode to the anode compartment,
    wherein an at least partly flat, electrically conductive conductor portion is electrically connected with the surface profile of the wall portion via a surface and wherein an electrical conductivity per unit area of the conductor portion is greater than that of the wall per unit area of the wall portion, wherein the wall portion has a wall thickness which is less than the thickness of the at least partly flat conductor portion in the region of the surface.

2. The electrochemical storage device as claimed in claim 1,
    wherein the surface of the conductor portion is adapted to the surface profile of the wall portion.

3. The electrochemical storage device as claimed in claim 1,
    wherein the wall portion and the at least partly flat conductor portion are metallic and connected together in a mechanically load-bearing manner via a strong metallic connection.

4. The electrochemical storage device as claimed in claim 1,
    wherein the wall portion is arranged closer to the top part than to the bottom part.

5. The electrochemical storage device as claimed in claim 1,
    wherein the wall portion is arranged at the side part.

6. The electrochemical storage device as claimed in claim 1,
    wherein the at least partly flat conductor portion partly or completely surrounds the top part.

7. The electrochemical storage device as claimed in claim 1,
    wherein the at least partly flat conductor portion projects above the top part.

8. The electrochemical storage device as claimed in claim 1,
    wherein the conductor portion has a surface on which an electrical insulator is mounted.

9. The electrochemical storage device as claimed in claim 1,
    wherein the electrically conductive wall portion is comprised by the side part, which is made from shaped sheet metal.

10. A thermal module for storing and releasing electrical energy, comprising
    multiple electrically interconnected electrochemical storage devices as claimed in claim 1,
    wherein the at least partly flat conductor portion is contacted electrically with suitable electrical leads for infeed and outfeed of electrical charge to the anode.

11. The thermal module as claimed in claim 10,
    wherein the conductor portion is also configured as a support, which supports the electrochemical storage devices against other electrochemical storage devices, against other supports of other electrochemical storage devices and/or against a module surface.

12. The thermal module as claimed in claim 10,
    wherein the at least partly flat conductor portion has a suitably shaped receptacle for an insulator.

13. The electrochemical storage device as claimed in claim 3,
    wherein the strong metallic connection comprises a welded joint.

14. The electrochemical storage device as claimed in claim 6,
    wherein the at least partly flat conductor portion is arranged around the top part as a conduction sleeve.

15. The electrochemical storage device as claimed in claim 8,
    wherein the surface on which an electrical insulator is mounted comprises a surface facing away from the electrochemical storage device.

16. The electrochemical storage device as claimed in claim 1,
    wherein the electrical connection between the wall portion and the at least partly flat conductor portion is brought about by a flux material that connects the conductor portion with the wall portion by a welded joint.

17. The electrochemical storage device as claimed in claim 1, further comprising a contacting means that is electrically connected with the conductor portion and wherein the contacting means is not directly electrically connected with the wall portion.

18. The electrochemical storage device as claimed in claim 17,
    wherein the contacting means is electrically connected with the conductor portion via a welding material.

19. The electrochemical storage device as claimed in claim 1,
    wherein the wall portion and the conductor portion are in direct mechanical contact such that the electrical connection between the wall portion and the conductor portion is brought about by direct contact alone.

20. The electrochemical storage device as claimed in claim 1, wherein the conductor portion is positioned on a side of the wall portion facing away from the electrical storage device.

* * * * *